United States Patent [19]

Prunier

[11] Patent Number: 4,575,612
[45] Date of Patent: Mar. 11, 1986

[54] ARC WELDING GUIDE TUBE WITH NON-ADHESIVE TIP

[76] Inventor: Robert Prunier, Route de Semur-Crepand, 25100 Montbard, France

[21] Appl. No.: 366,343

[22] Filed: Apr. 7, 1982

[30] Foreign Application Priority Data

| Apr. 9, 1981 | [FR] | France | 81 07164 |
| Sep. 16, 1981 | [FR] | France | 81 17517 |
| Nov. 2, 1981 | [FR] | France | 81 20531 |
| Dec. 23, 1981 | [FR] | France | 81 24180 |

[51] Int. Cl.⁴ .............................. B23K 9/00
[52] U.S. Cl. .................. 219/137.43; 219/137.44; 219/137.61
[58] Field of Search ............ 219/137.43, 137.44, 219/137.61, 74

[56] References Cited

U.S. PATENT DOCUMENTS

| 2,329,904 | 9/1943 | Howard | 219/74 |
| 2,538,245 | 1/1951 | Hiller | 200/157 |
| 2,735,920 | 2/1956 | Valliere | 219/137.61 |
| 2,863,984 | 12/1958 | Schaefer et al. | 219/75 |
| 2,992,320 | 7/1961 | Hill | 219/75 |
| 3,108,180 | 10/1963 | Linnander | 219/137.44 |
| 3,142,746 | 7/1964 | Schmerling | 219/137.61 |
| 3,165,662 | 1/1964 | Norris | 314/129 |
| 3,239,648 | 3/1966 | Syrigos | 219/137.43 |
| 3,444,353 | 5/1969 | Wilson | 219/136 |
| 3,536,888 | 10/1970 | Borneman | 219/137.43 |
| 3,590,212 | 6/1971 | Corrigall et al. | 219/137.43 |
| 3,597,576 | 8/1971 | Bernard | 219/137.43 |
| 3,730,136 | 5/1973 | Okada | 219/137.44 |
| 4,280,043 | 7/1981 | Feix et al. | 219/74 |

FOREIGN PATENT DOCUMENTS

| 0042311 | 12/1981 | European Pat. Off. |
| 791871 | 10/1935 | France |
| 1117607 | 6/1968 | United Kingdom |

Primary Examiner—Roy N. Envall, Jr.
Assistant Examiner—Alfred S. Keve
Attorney, Agent, or Firm—Lackenbach Siegel Marzullo Presta & Aronson

[57] ABSTRACT

A guide tube for guiding a wire (23) of filler metal in an arc welding machine and for applying arc current thereto comprises a metal body (80) having a longitudinal bore (82) through which the wire passes. Near the front end of the tube there are two transverse passages (95) housing respective ball (96) which are urged to project into the bore by respective spiral compression springs (97). These serve to keep the wire pressed against the opposite side of the bore to maintain good electrical contact. The springs are held in by a sheath (100) fitted over the end of the tube. The sheath also serves to keep an end piece (50) in place. Both the sheath and the end piece are made of refractory material which is electrically insulating and which is non-adhesive to spattering metal from the weld melt. This helps to prevent the front of the tube getting clogged up in operation.

15 Claims, 18 Drawing Figures

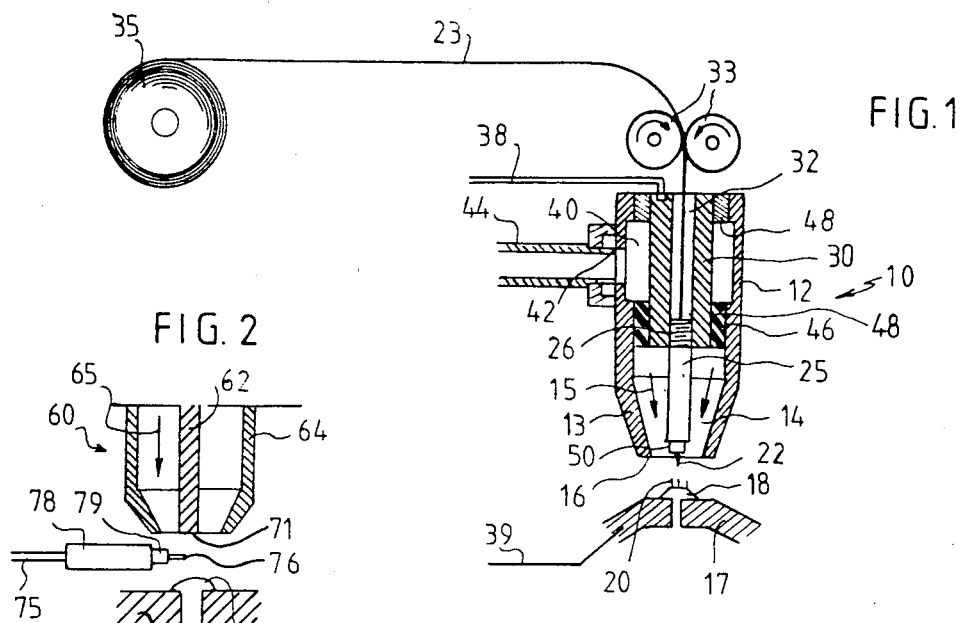
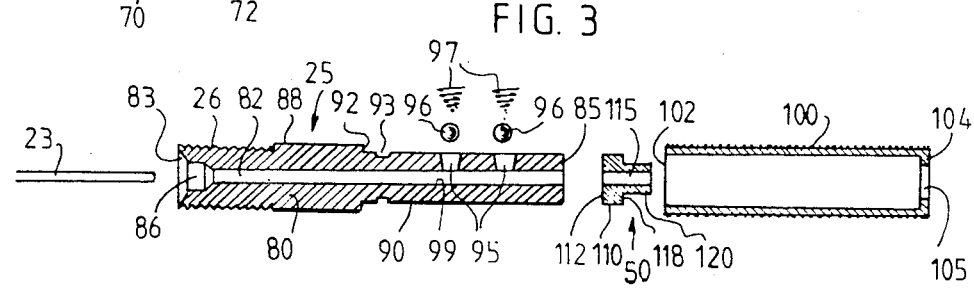
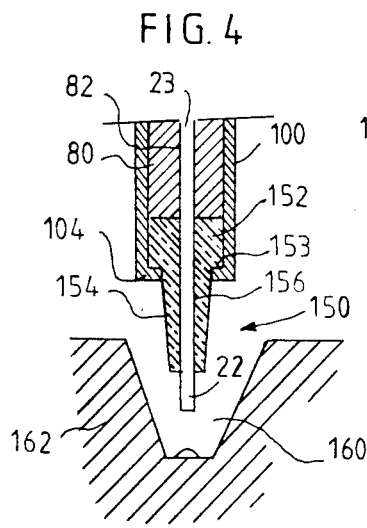
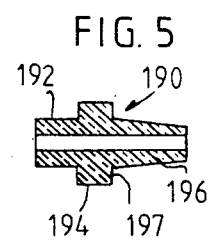
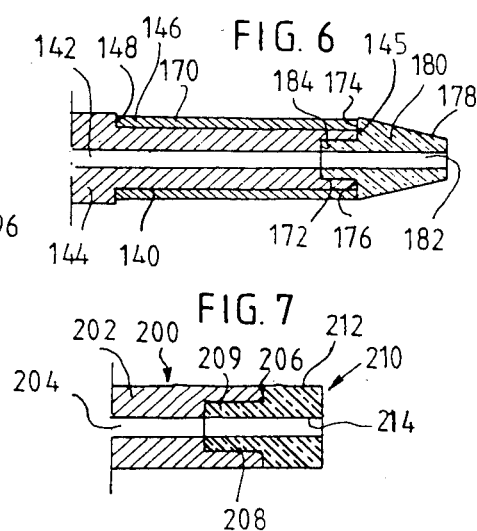
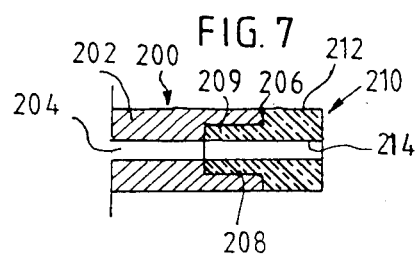

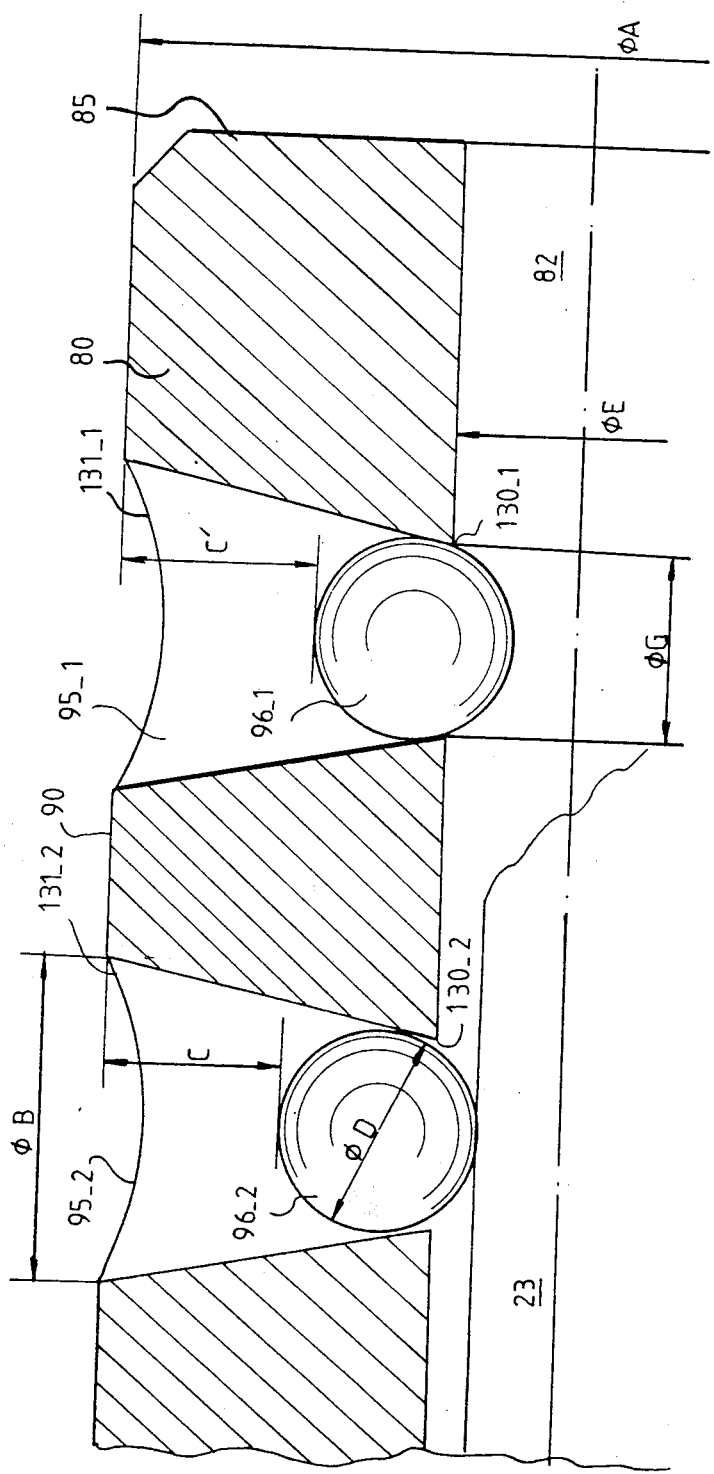

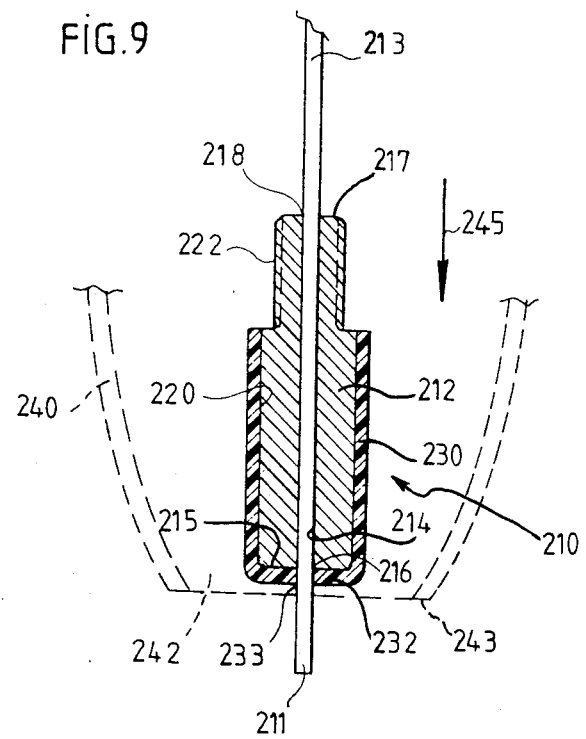

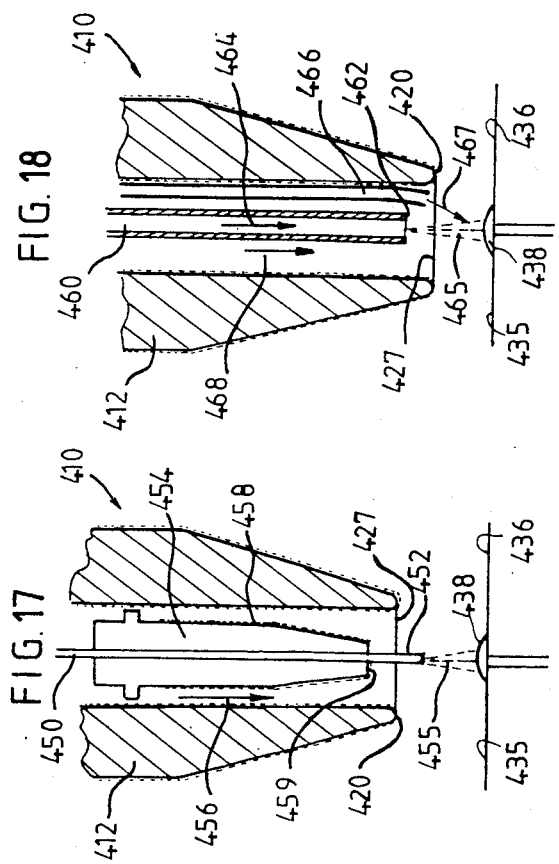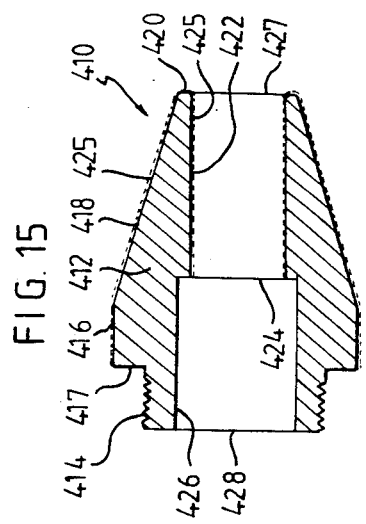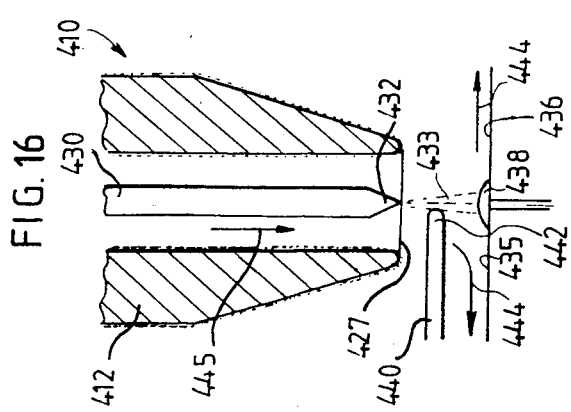

ARC WELDING GUIDE TUBE WITH NON-ADHESIVE TIP

The invention relates to welding apparatus or installations in which the heat given off by an electric discharge in a gas, eg. by an electric arc, is used to raise the temperature of a zone of metal to be welded while adding filler metal thereto.

BACKGROUND OF THE INVENTION

In some welding methods falling into this general category, the filler metal is supplied in the form of a wire which is unwound from a reel as fast as it is used up. In this type of method, the wire is sometimes used as an arc-formin electrode, and sometimes not.

For accurate welding, the end of the filler wire must be suitably guided relative to the zone to be welded. Further, the wire must be moved along a weld line smoothly and without jerking.

Traditionally, the wire of filler metal is guided by a tube having a bore with a rear opening through which the wire enters the tube and a front opening through which a short length of wire projects to be presented in a suitable position next to a weld zone.

In many methods, a welding machine further includes a nozzle for blowing an inert or an active gas over the weld zone to keep it under a controlled atmosphere. This avoids unwanted reactions of the molten material with the surrounding air or possibly with the gasses evolved by the welding operation.

In high performance welding machines, the position relative to the weld both of the gas nozzle and of the system for feeding filler wire to the weld zone are adjustable under the control of automatic regulator apparatus. Such apparatus is used in particular to maintain certain parameters of the welding operation, eg. the arc current, within set limits thereby optimising operating conditions.

There is increasing development of such welding apparatus in order to weld high performance parts whose quality must remain very high with excellent reliability. In particular they can be used to weld together parts made from materials that are usually difficult to work and which do not mix readily with other materials.

Nonetheless, such apparatus can be difficult to use. In particular, the front ends of the filler metal guide tubes tend to deteriorate rapidly and to suffer from all sorts of incidents in which the filler metal wire sticks to the guide tube. This results in rapid deterioration of the quality of a welding machine's welding, and its automatic regulation mechanisms cease to operate correctly. These difficulties lead to the guide tubes being replaced frequently, which is an expensive operation since it halts production and consumes a large number of guide tubes.

It has further been observed in installations that use inert gas blowing nozzles, that the nozzle itself tends to deteriorate causing the size of the gas outlet to vary, in particular to get smaller, thereby perturbing the flow of gas over the weld.

Finally, in those cases where the guide tube is also used to supply electricity to the filler metal wire, rapid deterioration has been observed in the quality of the electrical contact therebetween, leading to all sorts of incidents in the operation of the welding apparatus, and to rapid degradation in the quality of the welds obtained.

Attempts have already been made to improve the electric contact by providing the guide tubes, also known as contact tubes in this case, with means for taking up the play between the filler metal wire and the tube bore, so that there is always a push fit between them regardless of the amount of wear. However, the means used for this purpose up to now have never been as successful as expected. This stems either from the fact that the mechanism provided is too complex, or from the fact that the mechanisms do not stand up well to the very high operating temperatures of the contact tubes, or else from the fact that the mechanisms themselves give rise to parasitic electric arcs which tend to destroy them.

In the face of these difficulties, preferred embodiments of the present invention provide welding apparatus, and in particular components for the portions thereof which are in the immediate vicinity of the welding process, having greatly extended lifetimes compared with existing apparatus and/or components, and which substantially improve, at reasonable cost, the quality of the welds obtained by maintaining high degree of regularity over long operating periods using the same components.

SUMMARY OF THE INVENTION

In a first aspect, the present invention provides a guide tube for an electric discharge welding machine, and in particular for an arc welding machine, said tube comprising a metal body having a longitudinal bore for guiding a wire of filler metal, said bore having an opening in a front face of said body, wherein said front face is provided with protective material which is not adhesive with respect to the molten metal in the immediate vicinity of the weld melt, thereby avoiding it sticking to said front face, particularly around the edges of said opening of the bore.

When the guide tube is also a contact tube for feeding electric current to the filler metal wire, the protective material on the front face of the tube should be electrically insulative.

Preferably the protective material used is a very high temperature refractory material constituted by a ceramic, eg. one based on alumina or on chromium dioxide. Further it is advantageous for the protection to be extended along the side walls of the tube.

Many tests have made it possible to observe that these arrangements prevent degradation of the front face of the guide tubes and make it possible to increase their service life considerably at the same time as improving the quality and regularity of the welds obtained.

Observations made on the operating conditions of the guide tube have shown that the front portion thereof is splattered with drops of molten metal from the melt. The drops may be of filler wire metal or from the metal of the parts being welded. In either case, if no precautions are taken, these drops tend to remain on the surface of the tube and to amalgamate thereon. They can then lead to the filler wire becoming stuck to the front face of the tube, at the outlet from the bore. This increases the force to be overcome when moving the wire forward, and can lead to its becoming completely blocked.

Further, when the tube is mounted in a torch device inside a nozzle for blowing a flow of gas over the weld melt, accumulations of metal spattered on to the outside of the tube tend to give rise to parasitic or secondary arcs between the tube, which will be under tension if it is a contact tube, and the parts being welded which are generally at system ground potential.

Such arcs erode metal from the surface of the tube, and may even weld the filler metal wire to the tube at the opening in the front face of the tube.

The formation of secondary arcs also upsets smooth operation of those regulator devices in automatic welding machines which respond to the arc current in order to set the length of the welding arc.

Finally, the increase in the volume of the end of the tube under the effect of the metal drops sticking thereto, tends to reduce the space available for the gas brought by the nozzle to escape. This reduces the gas flow, thereby altering the atmosphere around the weld melt and consequently altering the quality thereof.

By applying anti-adhesive insulator means to the front face of the tube, drops of metal spattered up from the weld melt are prevented from adhering to the tube and from clumping together thereon. Further, in the case of a contact tube feeding current to the filler metal wire, the insulative nature of said means prevents secondary arcs forming between the contact tube and a surrounding nozzle. This prevents matter from accumulating in the nozzle opening and from interfering with the flow of gas therethrough.

These results can be further improved by extending the front face protection of the guide tube along its sides to provide a uniform outer surface over the entire length of the tube that is exposed to the immediate environment of the weld melt.

In a particularly advantageous embodiment of the invention, said front end protection can be provided by a solid end piece with a bore which extends the bore of the tube. The end piece should be made of a material, eg. a ceramic, which is practically impossible to weld with currently used filler metals. Such an end piece serves to prevent accidentally blocking of the end of the filler metal wire by avoiding melt metal getting up into the guide tube and damaging it because of its extremely high temperature. The end piece is advantageously tapered towards its front end.

In another embodiment, the material protecting the front face of the guide tube is deposited directly thereon as a covering, eg. by electrolytic deposition or projection, together with additional treatment.

In another embodiment, the protection is provided by an elongate protective sheath which surrounds the end portion of the guide tube around the outlet to its bore, and which is itself provided with a front partition. Such a sheath should be made of material which is thermally and electrically insulative, and which has anti-adhesive properties with respect to molten metal material as found around the weld melt. The sheath may be a ceramic sheath for example, or by a tube of refractory metal which is preferably coated inside and outside with a deposit of insulative refractory material such as a ceramic. The use of such a sheath can be particularly advantageous when means are used to take up play in the guide tube, the sheath then providing a degree of protection to said means from excessive heating, particularly to any springs that they may include.

Such a sheath may also be used as means for assembling and fastening a solid ceramic end piece of the type already mentioned.

According to another aspect, the invention also provides a nozzle for welding apparatus of the type mentioned so far, for blowing a gas, whether active or inert, over the weld. The nozzle has a metal body, usually of circular cross section, with an opening delimited by a lip surface joining its inside surface to its outside surface, said lip surface and said inside and outside surfaces being covered with a covering of insulating material that is refractory at high temperatures, eg. a ceramics material. Nozzles are thus obtained which are not fragile, and which in particular are not likely to explode on receiving a mechanical or a thermal shock. The covering prevents spattering from the weld melt adhering to the nozzle where it could block the outlet. Further, since the outside surface of the nozzle is made electrically insulative by the covering, there is no possibility of parasitic arcs striking across to the main arc current lead or to amalgams on other portions of the apparatus.

According to another aspect, the invention also provides a tube for guiding a wire of filler metal in a welding machine, the tube comprising a tubular body, preferably of metal, having a wire-guiding bore and at least one moving pressure member located in a passage in the body of the tube and extending transversely to its bore, said pressure member projecting resiliently into the bore from said passage. The resilience is provided by a helical compression spring which is conical in shape and which occupies a small depth of said passage. The resiliently projecting pressure member serves to push the filler metal wire against the opposite side of the bore through the guide tube.

Unlike a compression spring which is cylindrical in shape and whose turns stack on top of one another when the spring is compressed, giving a minimum compressed spring length equal to the sum of the thickness of the turns, a conical compression spring is flattened into a generally spiral shape when compressed. It can therefore be mounted together with a pressure member (such as a ball bearing) inside a very short passage made inside the thickness of a tube wall. This avoids any need for projections from the outside surface of the tube to house the means for taking up play. In particular the pressure member can thus be fitted at the end of a guide tube which is to be fitted inside a sheath of protective material as mentioned above for holding a protective end piece thereon.

In a preferred embodiment, the pressure member is electrically insulative, at least on its outside surface, and the surface of the spring is likewise covered in insulative material.

BRIEF DESCRIPTION OF THE DRAWINGS

Embodiments of the invention are described by way of example with reference to the accompanying drawings, in which:

FIG. 1 is a diagram showing welding apparatus fitted with a guide tube and a reel of filler metal wire.

FIG. 2 is a side view in partial section of apparatus using a different technique for feeding the filler metal wire from that shown in FIG. 1.

FIG. 3 is an exploded longitudinal section through a guide tube for filler metal wire.

FIG. 4 is a longitudinal section through the front end of a variant of the guide tube shown in FIG. 3.

FIG. 5 is a longitudinal section through a refractory end piece.

FIG. 6 is a longitudinal section through another form of guide tube for filler metal wire.

FIG. 7 is a partial section through a variant of the tube shown in FIG. 6.

FIG. 8 shows a detail of FIG. 3 on a larger scale.

FIG. 9 shows a form of protection for the front end of a guide tube.

FIG. 15 is a longitudinal section through a gas blower nozzle.

FIGS. 16, 17 and 18 show how the nozzle of FIG. 15 can be used in TIG, MIG and plasma welding, respectively.

MORE DETAILED DESCRIPTION

Figure 10:
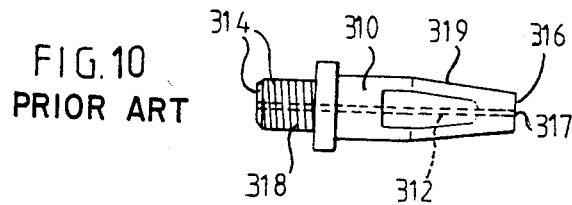
FIG. 10 shows a prior art contact tube.

FIG. 1 shows the head 10 of an electric arc welding machine which can operate either according to the metal active gas (MAG) process or else according to the metal inert gas (MIG) process. It comprises a metal head 12 whose bottom end terminates in the form of a nozzle 13, having a nozzle chamber 14 through which gas can flow in the direction of an arrow 15. The gas is active or passive relative to the weld melt depending on the welding technique being used. The bottom 16 of the nozzle 13 opens out over a work piece 17 on which a weld fillet 18 is being made. An electric arc 20 is maintained between the work piece 17 and one end 22 of a wire 23 of filler metal. The arc serves to keep the weld zone 18 at a very high temperature and causes the end 22 of the filler metal wire to melt away progressively.

Near to its end 22, the filler metal wire 23 is held in place by a tube 25 known as a contact tube. This tube is vertically mounted along the axis of the nozzle chamber 14. The upper end of the tube 25 is threaded and is screwed into a cylindrical conductive support 30 which has a longitudinal passage 32. The wire 23 is pushed forwards to compensate for its being consumed at the end 22 by two wheels 33, which unwind it from a reel 35 and push it down the longitudinal passage 32 into the bore of the contact tube 25 from whose front the end 22 projects. The cylindrical support 30 is supplied with electricity by a cable 38 connected to one terminal of a source of electricity whose other terminal is connected to the work piece 17 by a conductor 39. The bore along the contact tube 25 is calibrated to match the filler metal wire 23. It serves both to guide the wire and to supply it with electricity by contact between the bore and the wire, as is explained below.

Around the support 30, the body of the head 12 defines an annular chamber 40 having an inlet 42 passing through the wall of the head 12. A gas supply conduit 44 is connected thereto for supplying a gas suitable for the welding technique being used. The annular chamber 40 is connected to the nozzle chamber 14 via longitudinally extending channels 46 passing through insulating material 48 which electrically separates the support 30 from the body of the head 12.

The bottom of the nozzle 13 tapers slightly towards its axis, with its circular opening 16 surrounding a neutralizing ceramic end piece 50 (described in greater detail below) fixed to the front end of the tube 25 through which the end 22 of the filler metal wire 23 projects. The electric arc 20 and the weld zone 18 are bathed in the gas blown out from the nozzle in the direction of the arrows 15.

FIG. 2 shows electric arc welding apparatus 60 for use in the tungsten inert gas (TIG) process. An electrode 62 is disposed axially along the inside of a nozzle 64 via which gas is blown in the direction of an arrow 65 towards the part 70 to be welded. The end 71 of the tungsten electrode 62 is located in the opening of the nozzle 64. The electrode 62 and the part 70 are supplied with electricity in such a manner as to maintain an arc between the end 71 of the electrode 62 and the weld zone 72 on the part 70. Filler metal is added in the form of a wire 75 whose end 76 advances across the arc near the point where it leaves the electrode 62 at the outlet from the nozzle 64. The wire of filler metal 75 is guided by a guide tube 78 whose front end is terminated by a ceramic neutralising end piece 79.

The contact tube 25 (FIG. 3) comprises a tubular body 80 made of an electrically conductive metal such as copper. It has a longitudinally extending bore 82 which interconnects its front end 85 with its rear end 83. The diameter of the bore is uniform except near the rear end of the tube where it is first enlarged at 86 and then countersunk at the end 83 to facilitate inserting the filler metal wire 23 therein. Going along the tube from its rear end 83 to its front end 85, its outside surface comprises the following regions: the thread 26; a cylindrical portion 88 having two diametrically opposed flats to give a spanner a purchase on the tube; and then a shoulder 92 leading to a front cylindrical portion 90. A circumferentially extending groove 93 is cut into the front cylindrical portion near to the shoulder 92.

Two tapering passages 95 are made through the wall of the tube perpendicularly to its axis. The small ends of the tapering passages 95 open out into the bore 82. The large ends of the passages 95 open out in the front portion 90 roughly half way between the shoulder 92 and the front end 85. The passages 95 both lie on the same generator line of the tube. They receive respective balls 96 with a diameter which is slightly larger than the diameter of the small ends of the tapering passages 95. Each ball 96 is urged to project into the bore 82 by a respective compression spring 97 having conical turns with the smaller of the end turns pressing against the ball. The larger of the end turns is located in the opening at the larger end of the tapering passage 95 and is held therein by a cylindrical sheath 100 having an inside diameter that is substanially equal to the outside diameter of the cylindrical portion 90. The sheath 100 is fitted over the portion 90 by putting the front end 85 of the tubular body 80 into the rear end 102 of the sheath 10. The sheath is long enough for its rear end to abut against the shoulder 92 when fitted in position. The sheath 100 is of such a thickness that when in position, the outside surface of the sheath 100 constitutes an extension of the cylindrical portion 88 of the tube 80.

The neutralizing end piece 50 is a single ceramics block comprising two juxtaposed co-axial cylindrical portions, namely a front portion 120 and a rear portion 110, together with an axial bore 115 of the same diameter as the bore 82. In the assembled tube 25, the end piece 50 has a rear face 112 which is applied against the front face 85 of the body of the tube 80. The rear cylindrical portion 110 of the end piece 50 is of substantially the same diameter as the inside diameter of the sheath 100 and is lodged therein. The front portion 120 is of smaller diameter than the rear portion 112 and is joined thereto via a shoulder 118. The front end of the sheath 100 is partially closed by an inwardly turned rim 104 which bears against the shoulder 118 of the end piece 50, leaving an opening 105 via which the front portion 120 of the end piece 50 projects for about 5 mm.

Thus, once the contact tube 25 is assembled, the sheath 100 serves to retain both the neutralising end piece 50 on the front end of the tube 80, and also the compression springs 97 in their respective passages 95.

In operation of apparatus of the type shown in FIG. 1, the tube 25 serves to guide the filler metal wire 23, letting it run smoothly without jerking inside the bore 82. The wire is held in good electrical contact with the inside wall 99 of the bore opposite to the passages 95 by the thrust from the balls 96. The spring force acting on the balls 96 is chosen so that when the balls are lifted off their respective seats by a wire passing through the bore 82, the balls press the wire firmly against the opposite side 99 of the bore 82. The wire then passes through the ceramic end piece 50 to present a perfectly straight length of wire at its leading end 22 opposite to the weld melt at the outlet from the nozzle 13.

FIG. 8 is an enlarged view of the play take up means constituted by the balls 96. It shows one ball 96-1 pressed against its seat 130-1 projecting out from the passage 95-1 into the bore 82. In this position, the ball projects far enough into the bore to engage a wire 23 of a diameter chosen for its fit inside the bore. As shown, the wire 23 lifts the ball 96-2 off its seat 130-2, pushing it towards the larger opening 131-2 of the conical passage 95-2 at the outer surface 90 of the tube. The motion of the play take up balls between the position shown for the ball 96-1 and the ball 96-2 is absorbed by their respective conical compression springs 97. This compression spring effect is made possible in the very thin space available in the thickness of the wall of the tube 25, by virtue of the conical shape of the turns of the spring which enables them to stack inside one another rather than on top of one another. The springs 97 are not shown per se in FIG. 8, but their compressed length C and their extended length C' are shown. It can be seen that the absolute lengths are relatively small, as is the difference between them. Thus, in a tube 25 with an outside diameter A of 6 mm, for guiding a wire that is 1.6 mm in diameter (F) the diameter E of the bore 82 is 2 mm. The wall thickness through which the passages 95 are pierced is thus 2 mm. The balls 96 are also 2 mm in diameter (G), resting on seats 130 that are 1.8 mm in diameter. C and C' are then 0.4 and 0.6 mm respectively.

The following table summarises various examples of suitable dimensions for the play take up means shown in FIG. 8. In all cases the balls are 2 mm in diameter (D) and their seats 130 are 1.8 mm in diameter. H is the uncompressed height of the springs 97 and a is the angle of their conicity and (B) is the diameter of the openings 131.

| A | B | C | C' | E | F | a | H |
| --- | --- | --- | --- | --- | --- | --- | --- |
| 6 | 2.6 | 0.75 | 0.95 | 1.3 | 0.9 | 20° | 3 |
| 6 | 2.5 | 0.4 | 0.6 | 2 | 1.6 | 20° | 3 |
| 7.2 | 3 | 0.8 | 1 | 2.4 | 2 | 28° | 4 |
| 9.7 | 3.5 | 1.6 | 1.8 | 3.2 | 2.8 | 26° | 4.5 |

All lengths are in millimeters.

By using conical springs 97, it is possible to obtain sufficient thrust on the wire to ensure good electrical contact between the wire and the tube, together with sufficient travel for the ball to accommodate the wear and irregularities to be expected in the wire and the tube, even after long use. Thus, for example, a conical spring having a relaxed length of 3 millimeters is used compressed in the range 0.4 to 0.6 mm. In such an arrangement the compressed spring is virtually flat, ie. each turn is practically entirely received inside the next larger turn. In this example the spring has three turns, using wire of 25 hundredths of a millimeter in diameter, a smallest turn of 1 mm inside diameter, and a largest turn of 2.3 mm outside diameter.

This arrangement makes it possible to house the entire play take up assembly, ie. the balls 96 and the springs 97 inside the wall of the tube 80 underneath the surrounding sheath 100 without any projections requiring slots in the sheath or hindering the flow of gas through the nozzle 13. The passages 95 are simple to produce using a conical drill bit. Minimal machining is thus required to produce play take up means that do not project beyond the thickness of the tube wall even if it is as little as 1.8 mm in thickness.

Depending on the nature of the metals used and on the size of the filler metal wire, a single ball may be adequate to take up any play. This is particularly the case for soft metals, eg. aluminum and its alloys. Otherwise it is better to provide two or more balls as shown in the figures.

One of the main advantages of play take up means is maintaining good electrical contact between the filler metal wire 23 and the bore 82 of the tube 25 in spite of the tube wearing during use. This serves in particular to stop arcs striking inside the tube, since such arcs lead to pitting and to burned zones which have the effect of deteriorating electrical contact, and hence make further arcing all the more likely. Using two balls as shown serves to spread out the zone of contact between the wire and the tube along a generator line of the tube, and thereby reduces friction and hence wear.

The balls 96 are advantageously made of electrically insulating material, and preferably from a hard material. Balls made of quenched glass, ceramics, ruby or synthetic sapphire may be used. The use of an insulating material further reduces the chances of arcing inside the contact tube 25. In spite of being relatively expensive, ruby balls have the advantage of being very hard which increases tube lifetime.

The springs 97 may be made of refractory stainless steel or of Inconel or of a ni-mo-nick alloy that withstands high temperatures. Further, it is advantageous to cover their surface with a covering such as chromium dioxide, eg. using a pistol device or heat treatment, in order to make them electrically insulating. This further reduces the dangers of arcing inside the tube, thereby increasing its operating qualities and its length of life. In addition to their corrosive effects, parasitic electric arcs striking inside prior art tubes also tend to interfere with the smooth motion of the wire, thereby causing non-uniformities in the welding.

The sheath 100 is made of refractory steel capable of withstanding temperatures of up to 1100° C., for example. It is completely covered, both inside and outside, with an electrically insulating material, such as chromium dioxide in the present example, applied in the same manner as to the springs. This ensures that drops of metal spattered up from the weld melt 18 (FIG. 1) during welding do not adhere to the sheath 100 even if they do enter the nozzle 13. This avoids solid material from accumulating on the tube 25 which could partially block the path of gas being blown out through the nozzle. Parasite arcs are therefore avoided between the contact tube 25 and the nozzle 13. Finally, the sheath 100 provides thermal insulation for the body of the tube 80 and in particular for the play take up means.

The nozzle 13 itself is preferably covered with a ceramic covering.

The embodiment illustrated with the end piece 50 (FIGS. 1 and 3) has the advantage that in the event that the filler metal wire 23 should accidentally become blocked, the molten metal which then tends to run up the contact tube 25 has no chance of adhering thereto because of the zero degree of weldability of the ceramic material from which the end piece is made. The front end of the sheath 100 which is relatively thin is thus protected from the extremely high temperatures which it would be in danger of suffering if there were no neutralising end piece 50.

In an advantageous embodiment of the invention, the end piece 150 is long and tapering as shown in FIG. 4. It is mounted at the front end of the tube body 80 by the sheath 100 as before. It has a cylindrical rear end portion 152 leading via a shoulder 153 to the larger or rear end of a tapering front portion 154, which front portion may be 10 mm long. The shoulder 153 abuts against the inwardly turned rim 104 of the sheath 100 and the filler metal wire 23 passes through a bore 156 which extends the bore 82. The leading end 22 of the wire 23 projects from the small front end of the tapering portion 154. This shape of end piece 150 is particularly useful when welding at the bottom of a hollow such as 160 in the parts 162 to be welded. The end piece 150 prevents weld melt from accumulating at the bottoms of hollows 160 and melting the bottom of the filler metal wire to the end of the contact tube itself. The tapered shape also helps promote gas flow from the nozzle into the bottom of the hollow 160 where the welding is being done.

In the example shown in FIG. 3, the sheath 100 is held to the body of the tube 80 by three point crimping at the circumferential groove 93 in the surface 90. It thus serves both to hold the springs 97 in place in their passages 95, and to hold the end piece 50 on the front end of the tube body 80, while protecting the sides of the tube.

In the embodiment shown in FIG. 6, the sheath protecting the sides of the tube is a mere sleeve 170 constructed and treated in the same manner as the sheath 100 and slipped over the outer surface 140 of the body 144 of a contact tube having a shoulder 148 against which the rear end of the sleeve 170 abuts. There is a counter bore or recess 172 at the front end 145 of the tube body 144. It is of larger diameter than the axial bore 142 and serves to receive the rear end of a neutralizing end piece 180 having its own bore 182 extending the bore 142 of the tube body 144. The end piece 180 has a cylindrical rear portion 184 which fits in said recess 172, an outwardly extending shoulder 176 which comes into contact with the front face 145 of the tube body 144, and a forwardly tapering conical portion 178 projecting from the shoulder 174. The large base of the conical portion 178 is the same diameter as the outside diameter of the sleeve 170. The end piece 180 is held to the front of the tube body 144 by means of a high temperature adhesive capable of withstanding temperatures of 1100° C., eg. the adhesive sold under the trade mark Autostic by the firm Carlton Brown (represented in France by SERAC, 55 Avenue Anatole France, 92700 COLOMBES).

The end pieces 50, 150 or 180 may be made from alumina based materials. They are hard, insensitive to thermal shock, and good electrical insulators.

In FIG. 5, such an end piece 190 comprises a cylindrical rear portion 192 suitable for being received in an end recess such as the recess 172 in the tube body 144 shown in FIG. 6. The end piece then has a girth portion 194, which is cylindrical, but of greater diameter than the rear portion 192. The girth portion fits over the end of the tube body, but is small enough to fit inside a sheath such as the sheath 100 described with reference to FIG. 3. Thereafter there is a forwardly tapering front portion 196 which has a large base of smaller diameter than the girth portion so that it can project through the front opening 105 of the sheath, with the inwardly turned lip 104 abutting against the front shoulder 197 on the girth portion 194.

Filler metal wire guide tubes such as have been described above can advantageously be used in welding machines of types other than that shown in FIG. 1. For example, the machine shown in FIG. 2 does not use the guide tube to supply arc current. The tube serves to guide the filler wire 75 so that its leading end is accurately placed in the arc and so that it advances smoothly without jerking. It is provided with a ceramic end piece 79 to avoid the filler wire becoming welded to the end of the guide tube in the event of the leading end 76 stopping accidentally. Its sides are advantageously covered with a protective sheath such as the sheath 100 to help avoid any drops of molten metal spattering up from the weld melt 72 and sticking to the tube 78. Play take up means may be fitted optionally.

In flux type welding machines, flux powders are applied to the weld zone 72 in addition to the filler metal 76. The flux powders, whether they are inert or active, have the effect of greatly reducing spattering, and thus the sides of the guide tube 78 do not need to be protected. In this case a guide tube 200 of the type shown in FIG. 7 may be used. The tube comprises a metal body 202 having a filler wire guide bore 204. At the front end 206 of the tube 200, there is an axial counter bore or recess 208 for receiving the rear end 209 of an end piece 210. The front end of the end piece 210 extends the cylindrical shape of the tube body 202, and also extends the bore 204 with a bore 214. The end piece 210 is glued in place using a suitable high temperature adhesive. In the event of the end of the filler wire accidentally stopping, the end piece 210 plays the same neutralizing role as has already been described. Also, by virtue of its extreme hardness, the extension 214 of the bore 204 wears very slowly.

In FIG. 9, a guide tube 210 comprises a body 212 made of copper for example, having an axial bore 214 opening out in a front face 215 via an opening 218. The diameter of the bore 214 is calibrated to pass a wire 213 of filler metal. The leading end 211 of the wire projects beyond the front face 215 of the tube towards the part to be welded.

The outer surface 220 of the tube body 212 extends at its rear end in the form of a threaded portion 222 of smaller outside diameter than the rest of the body. The tube 210 is supplied with a heavy welding current by means that are not shown in the drawings.

Around the surface 220 and over the front surface 215 which is perpendicular to the axis of the bore 214, the tube body 212 is covered with an electrically and thermally insuating sheath 230. In the example, the sheath 230 is made of braided fiber glass covered with an outer covering based on silicone. The sheath 230 is preformed to fit over the tube body 212 and is held thereon by adhesive, for example. A silicone adhesive is suitable. The sheath may be about 1 mm thick.

The front portion 232 of the sheath covering the front end face 215 of the tube body 212 has a central opening 233 which fits tightly around the filler metal wire 213. In one embodiment, the sheath 230 is made as a cap whose front portion 232 completely covers the opening 216 of the guide tube 210. The first time the tube is used the filler metal wire pierces a hole through the portion 232.

Dashed lines in FIG. 9 show an outer nozzle 240 coaxially surrounding the guide tube 210. The nozzle 240 has an outlet 242 at much the same level as the front end 215 of the tube body 212, thereby leaving an annular space between the sheath 230 and the rim 243 of the opening 242, through which gas flowing inside the nozzle in the direction of an arrow 245 can escape.

The electrical and thermal insulating properties of the sheath 230, together with its anti-adhesive properties, ensure that drops of metal splattered up from the weld melt do not interfere with the smooth progress of the wire 213 out from the tube 210. This ensures a constant arc from the leading end 211 of the wire, and constant dimensions for the gas from the nozzle 240 to escape through. In particular, parasitic arc striking between the tube 210 and the nozzle 240 are thereby avoided.

When the guide tube is provided with play take up means, the sheath 230 has the further advantage of protecting said means against excessive heating which could damage the mechanical characteristics of the parts, in particular any springs, used to take up the play.

FIG. 10 shows a prior art guide tube 310 having an elongate body, usually made of copper, having an axial bore 312 running from a rear end 314 to a front end 316. The rear end of the tube 310 is threaded at 318. The outside surface 319 of the tube 310 has a gently tapering front portion. In spite of this, however, the bare end face 316 is subjected to spattering by very high temperature drops of metal from the weld melt.

Figure 11:
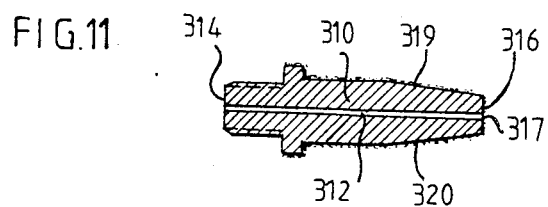
FIG. 11 shows one form of protective covering for the tube of FIG. 10.

FIG. 11 is a longitudinal section through a very similar tube to that shown in FIG. 10. However, in this case, the outer surface 319 of the tube is covered with a protective layer made by ceramic projection. This layer constitutes a protective covering 320 which is three to four tenths of a millimeter in thickness. It is white in color and extends right up to the rim of the outlet 317 from the bore 312 in the front face 316.

The covering 320 is made using a pistol of the type sold by Etablissements CHPOLANSKI, or any other firm which specialises in coating various kinds of surface with powdered material. A length of alumina is fed to the pistol, and is burned by a very high temperature flame. The flame products are projected by a blast of compressed air towards the surface to be covered, after said surface has been prepared by sand blasting.

The refractory covering 320 thus obtained prevents drops of molten metal from adhering to the tube body or from otherwise damaging it. In particular it protects the front end 316 adjacent to the outlet 317 from the bore. This has the advantage of reducing wear of said front portion 316.

Figure 12:
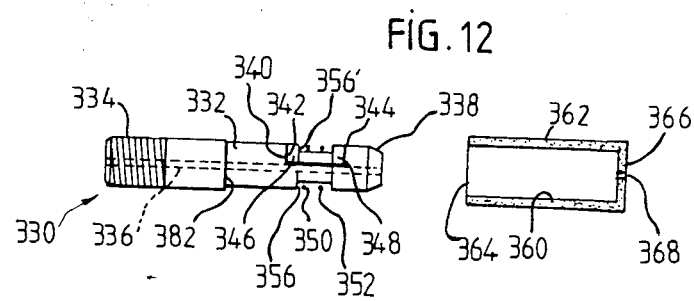
FIG. 12 shows a further disposition for protecting the end of a guide tube that includes means for taking up filler wire play.

FIG. 12 shows a contact tube having play take up means. It comprises a main cylindrical body 332 made of copper and provided at its rear end with a threaded portion 334. It has an axial bore 336. Its front portion 338 tapers steeply. An intermediate portion of the body 332 has notch 340 formed therein with a bottom surface that is plane and parallel to the axis of the bore 336 through which it passes. The ends of the notch are delimited by flanks 342 and 344 respectively which serve as end stops for a pressure member 346 located on the notch 340. One face 348 of said pressure member presses against the wire of filler metal passing through the tube. The pressure member is held in a position in which it presses against the wire by means of spring clips 350 and 352 which are lodged in a groove 356 made in the outer surface of the body 332 around the notch 342 and which extends into the pressure member 346 (groove portion 356'). The depth of the groove and the diameter of the clips or springs 350 and 352 are chosen in such a manner that the play take up means constituted by the pressure member 346 and its spring clips 350 and 352 do not occupy a greater outside diameter than that of the body 332.

The diameter of the body 332 is substantially equal to the inside diameter of a cylindrical ceramic sheath 362 which is open at one end 364 to receive the front end of the tube 330, and to cover the play take up means 340, 346, 356 when the front end 338 abuts against a front end disk 366 closing the front end of the tube 362. The front end disk 366 has a central hole 368 through which the filler metal wire passes in operation.

The ceramic sheath 362 is made fast to the tube 330 in a permanent manner by a suitable high temperature adhesive or cement for use with ceramics. In this example, the sheath 362 is about 1 mm thick, about 2.5 mm long and about 12 mm in diameter.

Figure 13:
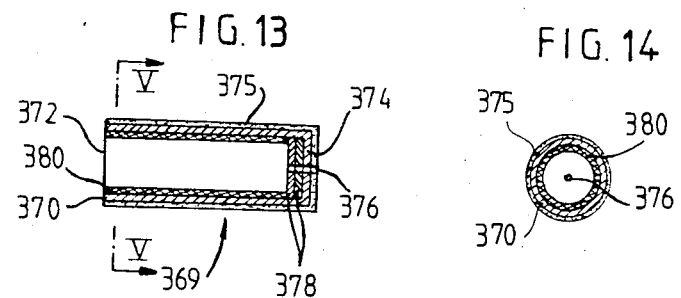
FIGS. 13 and 14 are longitudinal and transverse sections respectively through a protective sheath.
Figure 14:
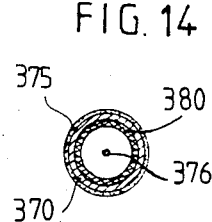

If operating conditions are such that a ceramic sheath such as the sheath 362 is not strong enough, eg. where the contact guide tubes are being used by hand instead of in a welding machine, a slightly different sheath 369 as shown in FIGS. 13 and 14 can be used instead. This sheath comprises a tubular strength member 370 made of refractory stainless steel and about ½ mm thick. This tube is open at one end 372, and is closed by a disk at its other end 374, except for a central hole 376 to pass the filler wire. On the outside the tube is covered with a layer of ceramic material which is projected thereon from a pistol, and which is two to three tenths of a millimeter in thickness. This layer also covers the front face 374.

Inside, the bottom of the tube 374 is covered with two disks of centrally pierced ceramics 378 which are held in place by an internal protective sleeve 380 made of braided silica fibers capable of withstanding 1200° C. The sleeve 380 is a tight fit around the front end 332 of the guide tube 330 (see FIG. 12).

The sheath 369 may be held on the tube 332 by crimping its rear end 372 near to a shoulder 382 at the rear end of the tube body 332.

It has been observed that guide tubes fitted with such protective sheaths have a useful service life which can exceed 50 to 60 hours.

FIG. 15 shows a nozzle 410 for blowing gas over a weld taking place. It comprises a solid body 412 made of a steel such as refractory stainless steel. It is generally tubluar in shape. It has an outer wall with a central cylindrical portion 416, a shoulder 417 on its rear side leading to a threaded cylindrical rear portion 414 of smaller diameter than the portion 416, and a forwardly tapering portion 418 on its front side. The small end of the tapering portion 418 comprises a curved lip 420 around a circular opening 427 and leading to the inside surface of a cylindrical channel 422 which passes axially through the nozzle 410. A joggle 424 in the channel 422 leads to a portion 426 of larger inside diameter leading to an inlet 428 for connection to a gas supply conduit in which the threaded portion 414 can be screwed.

The outer surface of the nozzle body 412 is entirely covered with a layer of ceramic type material, which in the present example is two to three tenths of a millimeter thick and made of alumina. The covering has a whitish appearance, and not only serves to protect the tapering front portion 418 and the central cylindrical portion 416 of the outer surface, but also serves to protect the entire inside surface of the smaller diameter front portion of the channel 422 from the joggle 424 to the lip 420 leading to the outside surface. The lip 420 is likewise completely covered with an alumina deposit, thereby ensuring a continuous layer of ceramic protection to the nozzle surface from the rear of the outer central cylindrical portion 416 forward to the front end back round over the lip 420 to the joggle 424 marking the end of the smaller diameter portion of the channel 422.

The layer of alumina is given the reference 425 in FIG. 15 and is represented by a dashed line. It is easily applied in practise using a conventional powdering pistol, eg. of the kind already mentioned above.

The layer of alumina 425 forms a skin which is highly insulating electrically, and which is capable of withstanding temperatures that are well above 1000° and may be as much as 2000°. This property makes it particularly adapted to protecting those portions of the nozzle which are exposed to weld melt spattering, in particular the lip 420, the front end of the channel 422 and the tapering portion 418. The covering thus obtained is not fragile, and adheres excellently to the nozzle surface it is protecting. Further the nozzle is strong enough to withstand shocks and deformation.

These properties make a nozzle such as the one shown in FIG. 15 particularly well adapted to different kinds of electric discharge welding apparatus, as shown in FIGS. 16, 17 and 18.

FIG. 16 shows a TIG type of apparatus fitted with the nozzle 412. In the apparatus, a tungsten electrode 430 is mounted axially inside the channel 422 with a leading end 432 substantially level with the opening 427. The electrode 430 is raised to a sufficiently high potential to establish an electric arc 433 between the tip 432 of the electrode 430 and a set of parts 435, 436 which are connected to electrical ground and which are being welded together by a weld fillet 438. A filler metal wire 440 is advanced perpendicularly to the electrode 430, and its end 442 is heated and melted by the arc 433, thereby adding metal to the fillet 438 on the edges of the parts 435 and 436 which are also heated by the arc. The weld melt is maintained under a controlled atmosphere of gas supplied in the direction of an arrow 445 by the nozzle 410. The gas strikes the weld 438 perpendicularly to the surface of the parts 435 and 436, and escapes sideways as indicated by arrows 444. It can be seen that in this environment, the nozzle 410 performs its usual function in the production of high quality welds with very low dilution of the metals joined by the weld, and without any the drawbacks of fragility previously associated with this kind of welding process.

FIG. 17 shows the nozzle 410 being used in MIG welding apparatus. A filler metal wire 450 is brought with its front end 452 close to the weld zone 438 by a guide tube 454 which also serves as an electrical contact tube. An arc 455 is maintained between the leading end 452 of the filler metal wire and the parts 435 and 436 to be welded together. A gas which is inert relative to the metals being welded is blown in the direction of an arrow 456 along the nozzle 410. The arc is formed in the flow of gas which escapes sideways after coming into contact with the weld melt 438. Many drops splatter up from the weld melt and strike the lip 420 of the nozzle as well as its lower surfaces both on the inside and on the outside. However, with the covering 425 it is observed that nothing accumulates to provoke parasitic arcs being struck. The opening 427 remains at its design size and there is no danger of the gas flow being impeded.

The guide tube 454 is likewise covered with a protective layer of alumina 458 which extends right up to the opening 459 through which the filler metal wire 450 leaves the tube 454.

FIG. 18 shows the nozzle 410 mounted in a plasma torch. A first tube 460 runs axially along the channel inside the nozzle and has a front opening 462 close to the opening 427 and opposite the parts to be welded 435 and 436. The first tube is connected by its other end to a plasma generator. That is to say apparatus which produces an electric discharge in a gas to produce a high ion current or plasma flowing in the direction of an arrow 464 along the tube 460 and so on towards the weld 438. The high temperature of the plasma ensures adequate heating of the weld zone. Filler metal in the form of a powder is projected into the heated weld zone by means of a second tube 466 which also passes along the inside of the nozzle 410. The front end of the second tube 466 is slightly offset relative to the front end of the axially mounted plasma tube 460. Powdered filler metal is projected into the weld melt in the direction of an arrow 467. A flow of gas is also supplied by the nozzle in the direction of an arrow 468 to maintain the weld zone under a suitable atmosphere. The turbulance resulting from these various jets of gas plasma or powder causes hot particles to be projected against the surfaces of the nozzle 410, which remains immune therefrom by virtue of the alumina covering.

These simple means thus serve to considerably increase increase the life time of nozzles used in various different welding processes which make use of an electric discharge.

In a variant, a layer of chromium dioxide may be used for the covering. It may be applied by projection or by heat treatment using diffusion under a vacuum in a furnace. Such coverings have the advantage of exceptional resistance to metal drops becoming stuck on the surface of the nozzle.

In all the embodiments which have been described above, it would also be possible to make a protective covering by electrolytically depositing chromium on the parts to be protected, and then oxidizing it at a high temperature.

Likewise, a particularly advantageous technique for industrially applying an alumina covering to all the faces of a part by initially applying a layer of aluminum electolytically thereto, and subsequently electrolytically oxidizing the surface of the layer of aluminum to obtain a layer of hydrated alumina. This process is particularly applicable to parts made of refractory stainless steel, steel or copper. It can profitably be used for covering contact tubes, TIG, MIG and MAG nozzles, and the moving parts of play take up means.

I claim:

1. A guide tube for guiding a filler metal wire in an electrical discharge welding apparatus, the tube comprising a tubular body having an axial bore for guiding the wire, and means for taking up play between the wire and the wall of the bore, said play take up means comprising at least one pressure member removably mounted in a passage transverse to the bore and opening out into the bore, the pressure member being urged by resilient means to project into the bore and thrust the wire against the opposite wall of the bore, and said resilient means comprise a spiral turn compression spring completely housed in said transverse passage; and said passage is shaped like a truncated cone being narrower at its end where it opens out into said bore, and said pressure member being a ball.

2. A tube according to claim 1, wherein said transverse passage opens out in the outside wall of the tube body via an opening which is closed by a sheath fitted over the tube and against which the larger end of the spiral compression spring bears.

3. A guide tube according to claim 1, comprising at least two passages each of which houses respective pressure members and resilient means, and said passages being made through the wall and in line with each other and along a line parallel to the axis of said tube body.

4. A guide tube for guiding a filler metal wire in an electric discharge welding apparatus, said guide tube comprising a tubular body having an axial bore for guiding the wire, and means for taking up play between the wire and the wall of the bore, said play take up means comprising resilient means and at least one pressure member movably mounted essentially within a passage in the wall of said tubular body transverse to the bore and opening out into the bore, the pressure member being urged by said resilient means to slightly project into the bore and thrust the wire against the opposite wall of the bore, wherein said resilient means comprising a conical or sprial compression spring completely housed in said transverse passage; and wherein said at least one pressure member is a ball which is electrically insulating, at least on its surface.

5. A tube according to claim 4, wherein said ball is made of a hard insulating material, such as quenched glass, ceramics, ruby or synthetic sapphir.

6. A guide tube for guiding a filler metal wire in an electric discharge welding apparatus, said guide tube comprising a tubular body having an axial bore for guiding the wire, and means for taking up play between the wire and the wall of the bore, said play take up means comprising resilient means and at least one pressure member movably mounted essentially within a passage in the wall of said tubular body transverse to the bore and opening out into the bore, the pressure member being urged by said resilient means to slightly project into the bore and thrust the wire against the opposite wall of the bore, wherein said resilient means comprising a conical or spiral compression spring completely housed in said transverse passage; and wherein the outer surface of said spring is electrically insulating by means of a refractory covering of either alumina or chromium dioxide.

7. A guide tube for an electrical discharge welding machine, said guide tube comprising:
a metal body having a longitudinal bore for guiding a wire of filler metal and supplying welding current to the filler metal wire by contact with the walls of the longitudinal bore, said longitudinal bore opening out in a front face of said metal body, wherein said front face is covered by a ceramic material element having a bore which registers with the bore of said metal body, said ceramic material element being non-adhesive with respect to metal that splatters up from a weld melt during welding, and said element being held in place on said front face by a protective sheath fitted over the front end of said body.

8. A guide tube according to claim 7, wherein at least the outside surface of said sheath is an electrically insulating refractory material.

9. A guide tube according to claim 8, wherein said refractory material is alumina.

10. A guide tube according to claim 9, wherein said outside surface is obtained by electrolytically depositing a layer of aluminum on the metal body and subsequently electrolytically oxidizing said layer of aluminum.

11. A guide tube according to claim 7, including means for taking up any play between said filler metal wire and the inside surface of the bore to maintain a constant push fit contact therebetween, said means including a resilient member, and the sheath covering the tube around said means serving as a stop for said resilient member.

12. A guide tube according to claim 7, wherein said material is electrically insulating.

13. A guide tube according to claim 7, wherein said material is a refractory material.

14. A guide tube according to claim 7, wherein said material is a ceramic material, such as alumina or chromium dioxide.

15. A guide tube for guiding a filler metal wire in an electric discharge welding apparatus, said guide tube comprising a tubular body having an axial bore for guiding the wire, and means for taking up play between the wire and the wall of the bore, said play take up means comprising resilient means and at least one pressure member movably mounted essentially within a passage within the wall of said tubular body transverse to the bore and opening out into the bore, said pressure member being urged by said resilient means to slightly project into the bore and thrust the wire against the opposite wall of the bore, wherein said resilient means comprising a conical or spiral compression spring completely housed in said transverse passage; and wherein the turns of said conical or spiral compression spring are adapted to nest inside one another.

* * * * *